(12) United States Patent
Inoue et al.

(10) Patent No.: US 8,193,767 B2
(45) Date of Patent: Jun. 5, 2012

(54) POWER RECEIVING DEVICE, AND ELECTRONIC APPARATUS AND NON-CONTACT CHARGER USING THE SAME

(75) Inventors: Tetsuo Inoue, Yokohama (JP); Takao Kusaka, Yokohama (JP)

(73) Assignees: Kabushiki Kaisha Toshiba, Tokyo (JP); Toshiba Materials Co., Ltd., Yokohama-shi (JP)

( * ) Notice: Subject to any disclaimer, the term of this patent is extended or adjusted under 35 U.S.C. 154(b) by 535 days.

(21) Appl. No.: 12/294,399

(22) PCT Filed: Mar. 22, 2007

(86) PCT No.: PCT/JP2007/000280
§ 371 (c)(1),
(2), (4) Date: Sep. 24, 2008

(87) PCT Pub. No.: WO2007/122788
PCT Pub. Date: Nov. 1, 2007

(65) Prior Publication Data
US 2009/0058358 A1    Mar. 5, 2009

(30) Foreign Application Priority Data
Mar. 24, 2006    (JP) .................................. 2006-082390

(51) Int. Cl.
*H02J 7/00* (2006.01)
(52) U.S. Cl. ...................................................... 320/108
(58) Field of Classification Search ................... 320/108
See application file for complete search history.

(56) References Cited

U.S. PATENT DOCUMENTS

| | | | | | |
|---|---|---|---|---|---|
| 5,479,083 | A | * | 12/1995 | Brainard | 320/121 |
| 5,600,225 | A | * | 2/1997 | Goto | 320/108 |
| 5,656,983 | A | | 8/1997 | Ito et al. | |
| 5,719,546 | A | | 2/1998 | Ito et al. | |
| 6,324,431 | B1 | * | 11/2001 | Zarinetchi et al. | 607/61 |
| 6,432,377 | B1 | * | 8/2002 | Hayashi et al. | 423/632 |
| 6,593,841 | B1 | * | 7/2003 | Mizoguchi et al. | 336/200 |
| 6,657,351 | B2 | * | 12/2003 | Chen et al. | 310/171 |
| 6,683,438 | B2 | | 1/2004 | Park et al. | |
| 6,962,833 | B2 | * | 11/2005 | Tuttle et al. | 438/55 |
| 7,042,196 | B2 | | 5/2006 | Ka-Lai et al. | |

(Continued)

FOREIGN PATENT DOCUMENTS

JP    52-153035 U    11/1977

(Continued)

OTHER PUBLICATIONS

U.S. Appl. No. 12/294,401, filed Sep. 24, 2008, Inoue et al.

(Continued)

*Primary Examiner* — M'Baye Diao
(74) *Attorney, Agent, or Firm* — Foley & Lardner LLP

(57) ABSTRACT

Disclosed is an electronic apparatus (1) comprising a power receiving device (2) and an electronic apparatus main body (3). The power receiving device (2) comprises a power receiving coil (11) having a spiral coil, a rectifier (12) and a secondary battery (13). The electronic apparatus main body (3) comprises an electronic device (14) and a circuit board (15). A magnetic foil (16) is arranged in at least one position between the spiral coil (11) and the secondary battery (13), the rectifier (12), the electronic device (14) or the circuit board (15). The magnetic foil (16) has a value expressed as the product of the saturation flux density MS and the thickness t, namely Ms·t, of not less than 15.

17 Claims, 8 Drawing Sheets

U.S. PATENT DOCUMENTS

| | | |
|---|---|---|
| 7,164,255 B2 | 1/2007 | Hui |
| 7,525,283 B2 | 4/2009 | Cheng et al. |
| 2005/0189910 A1 | 9/2005 | Hui |
| 2006/0061323 A1 | 3/2006 | Cheng et al. |

FOREIGN PATENT DOCUMENTS

| | | | |
|---|---|---|---|
| JP | 58-080753 U | 6/1983 | |
| JP | 04-122007 A | 4/1992 | |
| JP | 06-163273 A | 6/1994 | |
| JP | 07-231586 A | 8/1995 | |
| JP | 08-079976 A | 3/1996 | |
| JP | 08-148360 A | 6/1996 | |
| JP | 08-264351 A | 10/1996 | |
| JP | 09-190938 A | 7/1997 | |
| JP | 11-176677 A | 7/1999 | |
| JP | 11-265814 A | 9/1999 | |
| JP | 11-345724 A | 12/1999 | |
| JP | 2000-023393 A | 1/2000 | |
| JP | 2000-091113 A | 3/2000 | |
| JP | 2001-090031 A | 4/2001 | |
| JP | 2003-257751 A | 9/2003 | |

OTHER PUBLICATIONS

Machine Translation of JP 11-176677A, 5 pages.

T. Inoue, U.S. PTO Office Action, U.S. Appl. No. 12/294,401, dated May 27, 2011, 14 pages.

T. Inoue, U.S. PTO Office Action, U.S. Appl. No. 12/294,401, dated Nov. 16, 2011, 14 pages.

T. Inoue, U.S. PTO Notice of Allowance, U.S. Appl. No. 12/294,401, dated Apr. 3, 2012, 6 pages.

* cited by examiner

POWER RECEIVING DEVICE, AND ELECTRONIC APPARATUS AND NON-CONTACT CHARGER USING THE SAME

TECHNICAL FIELD

The present invention relates to a power receiving device which is applied to non-contact charging, and an electronic apparatus and a non-contact charger using the same.

BACKGROUND ART

The development of portable telecommunication equipments is remarkable in these years, and especially cellular phones are being made smaller and lighter quickly. In addition to the cellular phones, electronic apparatuses such as handy cameras (portable video cameras etc.), cordless telephones, laptop PCs (notebook PCs) and the like are also being made smaller and lighter. They have a secondary battery provided within an electronic apparatus main body so as to be usable without connection to a wall outlet. Thus, their portability and usability are enhanced. But, the capacity of the secondary battery is limited, and it is required to recharge once per several days to several weeks.

Recharging methods include a contact charging method and a non-contact charging method. The contact charging method performs charging with an electrode of a power receiving device directly contacted with an electrode of a power feeding device. The contact charging method is generally used because its apparatus has a simple structure. But, the weight of the electronic apparatus has been reduced with the downsizing and weight reduction of the electronic apparatus in these years, and the contact pressure between the electrode of the power receiving device and the electrode of the power feeding device becomes insufficient, causing a problem of defective charging. Since the secondary battery is weak against heat, it is necessary to design a circuit so that the secondary battery is not overdischarged or overcharged in order to prevent the battery from increasing its temperature.

Under the circumstances described above, the application of the non-contact charging method is being studied. Conventional non-contact charging methods mainly use a nickel-hydrogen battery as a secondary battery and therefore many of them have a disadvantage that their charging time is about eight hours. Meanwhile, since a high capacity secondary battery such as an Li ion secondary battery has appeared, the application of the non-contact charging method is being studied even for electronic apparatuses such as cellular phones, notebook PCs and the like which have relatively large electric power consumption and require fast charging.

The non-contact charging method provides a coil to both the power receiving device and the power feeding device and performs charging by electromagnetic induction. The non-contact charging method does not need a contact pressure between the electrodes taken into consideration. Therefore, a charging voltage can be fed stably without being influenced by the contact state of the electrodes. As a coil for the non-contact charger, a structure that a coil is wound around a ferrite core is known (see References 1, 2). A structure that a coil is mounted on a resin substrate having a ferrite powder and an amorphous powder mixed is also known (see Reference 3). But, the ferrite becomes brittle and has poor impact resistance when it is fabricated into a thin form, and the power receiving device tends to have a malfunction if the equipment is dropped.

To provide a thin power receiving portion in correspondence with the thinning of the equipment, there is adopted a planar coil that is formed with a metal powder paste printed in a spiral form on a substrate. There is proposed a configuration that coupling between a planar coil (primary coil) of a power transmission side and a planar coil (secondary coil) of a power receiving side is reinforced by a magnetic body (see References 4 to 6). The magnetic body (magnetic sheet) is used as a core material for enhancing the coupling between the primary coil and the secondary coil. When a power transmission speed becomes high, it becomes necessary to consider not only the coupling between the coils but also heat generation of peripheral parts.

Namely, in a case where the planar coil is used, magnetic flux passing through the planar coil is interlinked with the substrate and the like within the equipment, so that heat is produced within the device because of an eddy current generated by the electromagnetic induction. Therefore, there is a problem that high electric power cannot be transmitted, and a charging time becomes long as a result. For example, when the power transmission speed is increased without regard to heat generation, it is worried that carbon dioxide is produced within the Li ion secondary battery to expand and rupture it. Therefore, charging of a cellular phone by the non-contact charger takes about 130% longer than the charging time when charged by the contact charger.

The Li ion secondary battery used for cellular phones, digital cameras, portable game machines, portable AV devices and the like has a charging capacity per unit time increased to five times or more in comparison with a conventional nickel-hydrogen battery. Therefore, when it is intended to increase a power transmission speed by the non-contact charging method, a problem of heat generation due to the eddy current is nonnegligible. Thus, a power receiving device applying a conventional non-contact charging method is insufficient to take measures against the eddy current generated due to the electromagnetic induction and against heat generation due to the eddy current. The generation of the eddy current leads to the generation of noise and also becomes a factor for lowering the charging efficiency.

[Reference 1] JP-A 11-265814(KOKAI)
[Reference 2] JP-A 2000-023393(KOKAI)
[Reference 3] JP-A 09-190938(KOKAI)
[Reference 4] JP-U 58-080753(Japanese Utility Model Publication)
[Reference 5] JP-A 04-122007(KOKAI)
[Reference 6] JP-A 08-148360(KOKAI)

DISCLOSURE OF THE INVENTION

According to an aspect of the present invention, there are provided a power receiving device which can suppress heat generation due to an eddy current and a decrease in charging efficiency by suppressing the eddy current generated in the power receiving side by electromagnetic induction, and an electronic apparatus and a non-contact charger using the same.

A power receiving device according to an aspect of the present invention comprises a power receiving coil having a spiral coil; a rectifier rectifying an alternating voltage generated in the power receiving coil; a secondary battery to which a direct-current voltage rectified in the rectifier is charged; and a magnetic foil arranged in at least one of a position between the spiral coil and the secondary battery, and a position between the spiral coil and the rectifier, wherein when a saturation flux density of the magnetic foil is Ms [T] and a plate thickness of the magnetic foil is t [μm], the magnetic foil has a value (Ms·t) expressed as the product of the saturation flux density Ms and the thickness t of 15 or more.

An electronic apparatus according to an embodiment of the present invention comprises a power receiving device which is provided with a power receiving coil having a spiral coil, a rectifier rectifying an alternating voltage generated in the power receiving coil, and a secondary battery to which a direct-current voltage rectified in the rectifier is charged; an electronic apparatus body which is provided with an electronic device which is operated by the direct-current voltage supplied from the secondary battery, and a circuit board on which the electronic device is mounted; and a magnetic foil arranged in at least one of a position between the spiral coil and the secondary battery, a position between the spiral coil and the rectifier, a position between the spiral coil and the electronic device, and a position between the spiral coil and the circuit board, wherein when a saturation flux density of the magnetic foil is Ms [T] and a plate thickness of the magnetic foil is t [μm], the magnetic foil has a value (Ms·t) expressed by the product of the saturation flux density Ms and the thickness t of 15 or more.

A non-contact charger according to an aspect of the present invention comprises the electronic apparatus according to the aspect of the present invention; and a power feeding device which is provided with a power feeding coil arranged in a non-contact manner with the power receiving coil of the electronic apparatus and a power supply supplying an alternating voltage to the power feeding coil, wherein magnetic flux generated in the power feeding coil is transmitted to the power receiving coil to transmit electric power in a non-contact manner.

EXPLANATION OF REFERENCE NUMERALS

1 . . . . Electronic apparatus, 2 . . . power receiving device, 3 . . . electronic apparatus main body, 4 . . . housing, 11 . . . spiral coil (power receiving coil), 12 . . . rectifier, 13 . . . secondary battery, 14 . . . electronic device, 15 . . . circuit board, 16 . . . magnetic foil, 16a . . . bent portion, 16b . . . open portion, 17 . . . slit, 20 . . . non-contact charger, 30 . . . power feeding device, 31 . . . power feeding coil, 32 . . . magnetic core, 33 . . . power supply.

BEST MODE FOR CARRYING OUT THE INVENTION

Figure 1:
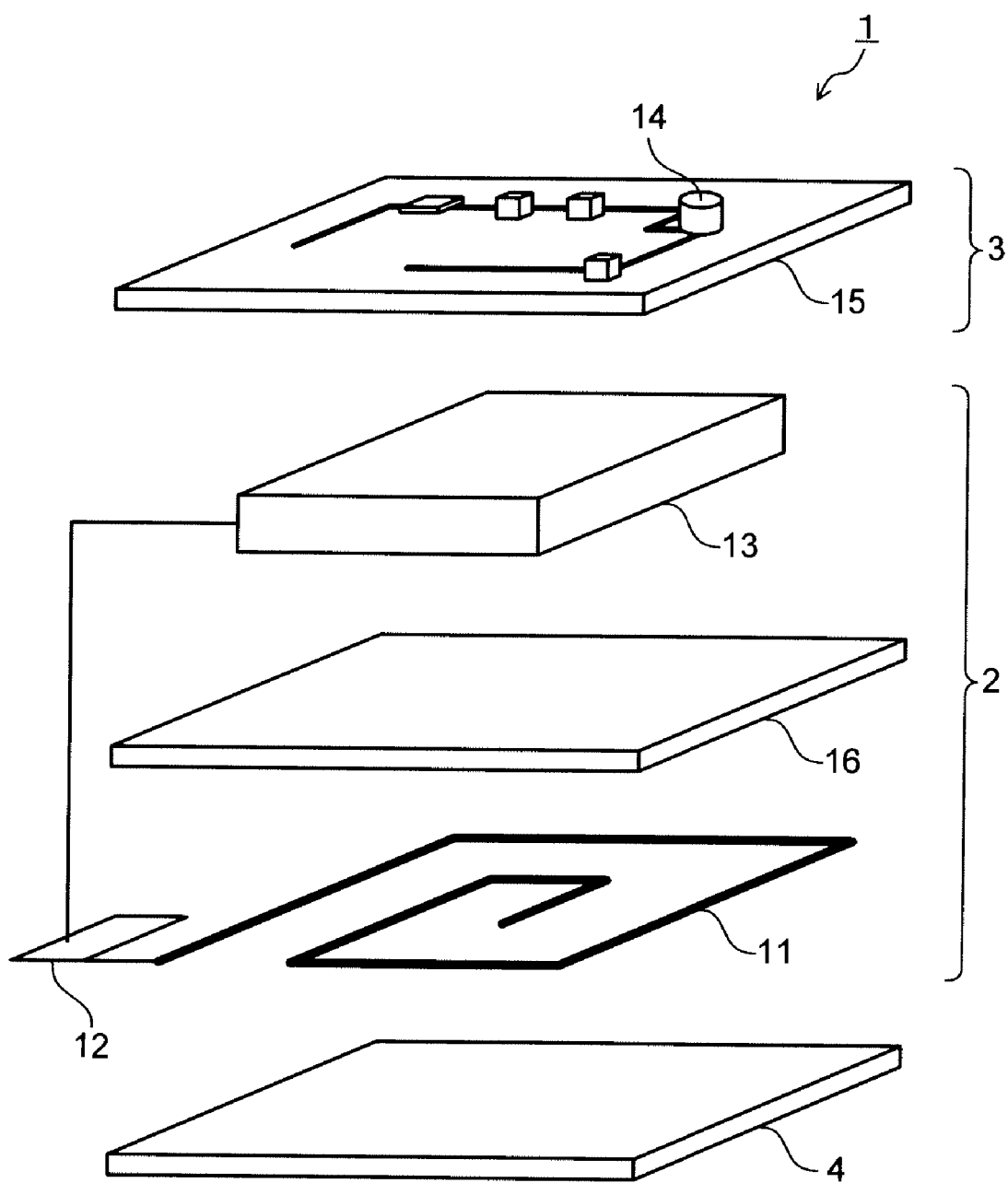
FIG. 1 is a diagram showing a structure of the electronic apparatus according to a first embodiment of the present invention.
Figure 2:
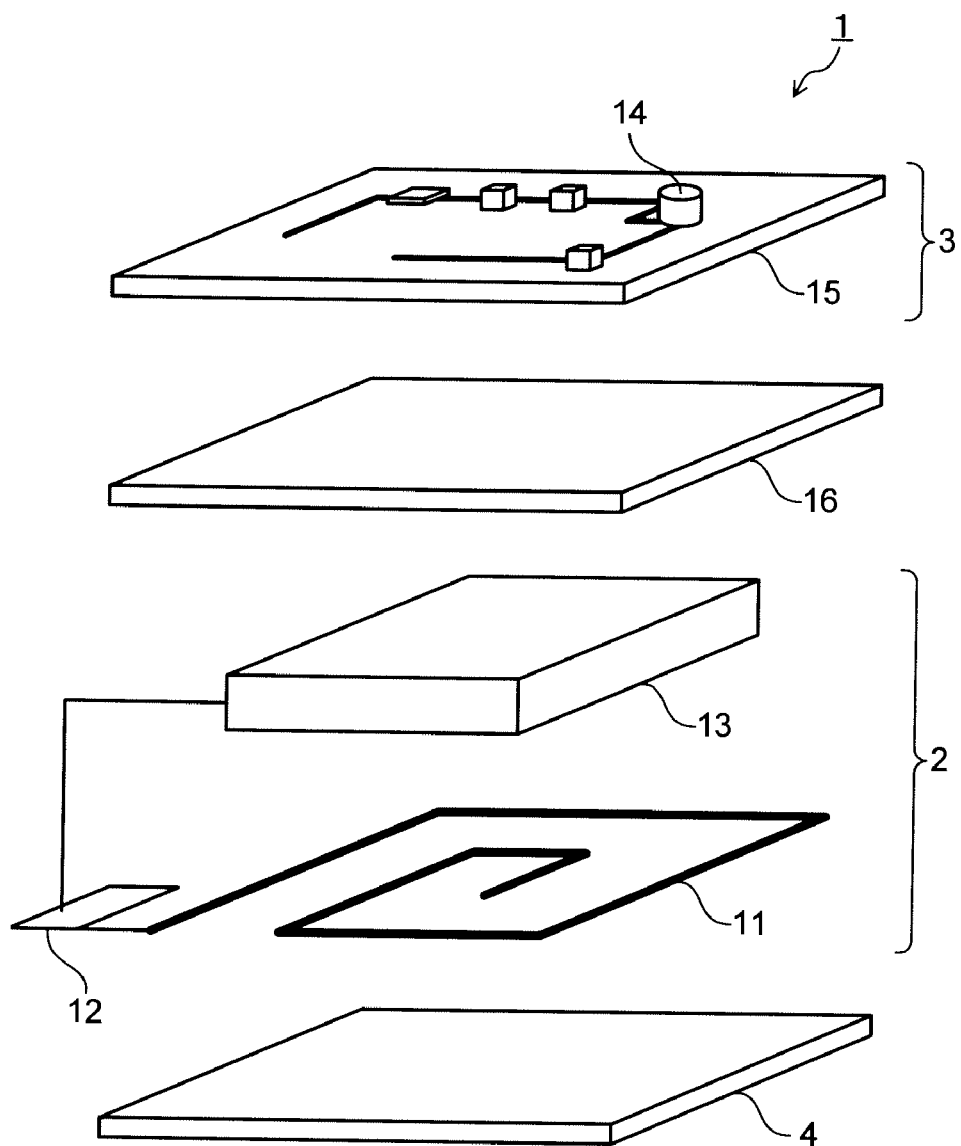
FIG. 2 is a diagram showing a structure of a modified example of the electronic apparatus shown in FIG. 1.

Modes of conducting the present invention will be described below with reference to the drawings. FIG. 1 and FIG. 2 show structures of electronic apparatuses according to a first embodiment of the present invention. An electronic apparatus 1 shown in FIG. 1 and FIG. 2 is provided with a power receiving device 2 and an electronic apparatus main body 3 applying a non-contact charging method. The power receiving device 2 and the electronic apparatus main body 3 are arranged in a housing 4, thereby configuring the electronic apparatus 1.

The power receiving device 2 includes a power receiving coil 11 having a spiral coil, a rectifier 12 rectifying an AC voltage generated in the power receiving coil 11, and a secondary battery 13 to which a DC voltage rectified by the rectifier 12 is charged. The electronic apparatus main body 3 includes an electronic device 14, which is operated by the DC voltage charged into the secondary battery 13 of the power receiving device 2, and a circuit board 15 on which the electronic device 14 is mounted. The electronic apparatus main body 3 may be provided with parts and devices depending on the functions, operations and the like of the electronic apparatus 1 in addition to the electronic device 14 and the circuit board 15.

As the spiral coil configuring the power receiving coil 11, a planar coil which has a metal wire such as a copper wire or the like wound in a flat state, a planar coil which is formed by printing a metal powder paste into a spiral form, or the like is used. The winding shape of the spiral coil is not limited to a particular shape such as circular, oval, square, polygon or the like. The winding number of the spiral coil is also determined appropriately according to the required properties.

The rectifier 12 includes semiconductor elements such as transistors, diodes and the like. The number of rectifiers 12 is arbitrary, and one or two or more rectifiers 12 are used, if necessary. The rectifier 12 may be a TFT or the like formed by a film forming technology. In FIG. 1 and FIG. 2, the rectifier 12 is provided on the side of the power receiving coil 11 of the circuit board 15. The rectifier 12 may be disposed on the opposite side of the power receiving coil 11 of the circuit board 15. The secondary battery 13 can be charged/discharged and used in a variety of forms such as a plate type, a button type and the like.

The electronic device 14 includes various types of elements and parts such as a resistance element, a capacitance element, an inductance element, a control element, a storage element, etc. configuring the circuit. In addition, other parts and devices are also included. The circuit board 15 has a circuit formed on the surface and inside of an insulation substrate such as a resin substrate, a ceramics substrate or the like. The electronic device 14 is mounted on the circuit board 15. The electronic device 14 may not be mounted on the circuit board 15.

The electronic apparatus 1 of the first embodiment is provided with a magnetic foil 16 which is arranged between the spiral coil (power receiving coil) 11 and the secondary battery 13 as shown in, for example, FIG. 1. In other words, the spiral coil 11 and the secondary battery 13 are disposed with the magnetic foil 16 sandwiched between them. The spiral coil 11 has a planar portion as at least a part of it, and the planar portion is disposed along a surface of the magnetic foil 16. When considered as the power receiving device 2, the magnetic foil 16 is arranged between the spiral coil 11 and the secondary battery 13 configuring it.

The magnetic foil 16 may be arranged between the secondary battery 13 and the circuit board 15 as shown in FIG. 2. In other words, the magnetic foil 16 is arranged between the spiral coil 11 and the circuit board 15. In addition, the magnetic foil 16 may be arranged between the spiral coil 11 and the rectifier 12 or between the spiral coil 11 and the electronic device 14. Among the above positions, the magnetic foil 16 is arranged in at least one position. The magnetic foil 16 may be arranged at two or more positions.

Figure 3:
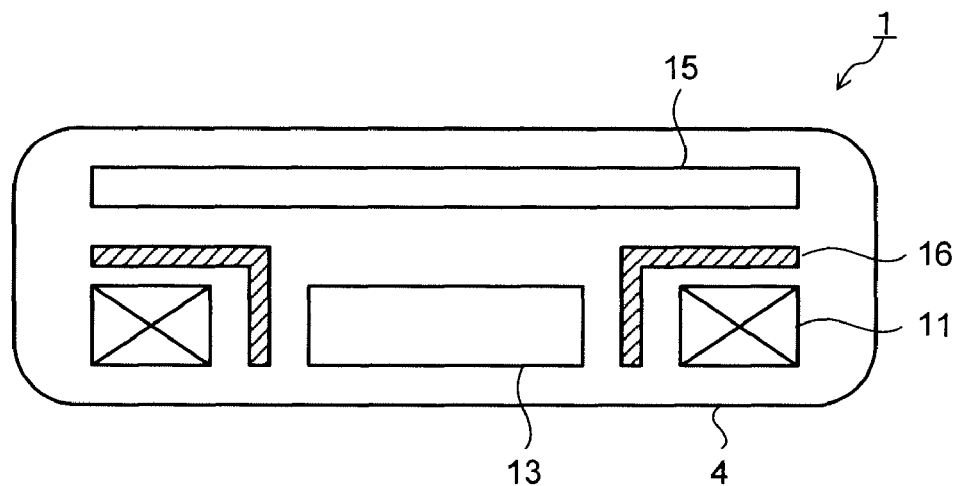
FIG. 3 is a diagram showing a structure of the electronic apparatus according to a second embodiment of the present invention.

FIG. 3 shows an electronic apparatus according to a second embodiment. The electronic apparatus 1 shown in FIG. 3 has the spiral coil 11 disposed around the secondary battery 13. In other words, the secondary battery 13 is disposed in a space provided at the center of the spiral coil 11. The magnetic foil 16 has a shape to protrude near the center so that the protrusion is positioned between the spiral coil 11 and the secondary battery 13 in addition to the presence of the magnetic foil 16 between the spiral coil 11 and the circuit board 15. The rectifier 12 and the electronic device 13 are omitted in FIG. 3.

The electronic apparatus 1 of the second embodiment may also have the magnetic foil 16 arranged between the spiral coil 11 and the circuit board 15, between the spiral coil 11 and the rectifier 12 and between the spiral coil 11 and the electronic device 14. The magnetic foil 16 is arranged in at least one of the above positions. The magnetic foil 16 may be arranged in two or more positions.

To decrease the width of the electronic apparatus 1, the structure according to the first embodiment is preferable. To decrease the thickness of the electronic apparatus 1, the structure according to the second embodiment is preferable. These embodiments are appropriately selected depending on the structure and the like of the electronic apparatus 1 applied. The structure of the electronic apparatus 1 is not limited to those of FIG. 1 through FIG. 3. The arrangement of the spiral coil 11, the secondary battery 13 and the circuit board 15 can be varied in various ways. For example, the secondary battery, the circuit board and the spiral coil may be arranged downwardly in this order. For example, the magnetic foil is disposed between the circuit board and the spiral coil.

In a case where the magnetic foil 16 is arranged between the spiral coil 11 and the circuit board 15, the spiral coil 11/magnetic foil 16/circuit board 15 may be simply stacked or may be fixed with an adhesive or a brazing material. The same is also applied to other cases, and the individual component elements may be stacked simply or may be fixed with an adhesive or a brazing material.

A magnetic flux flowing through the spiral coil 11 when charging can be shielded by the magnetic foil 16 which is arranged in one of the positions between the spiral coil 11 and the secondary battery 13, between the spiral coil 11 and the rectifier 12, between the spiral coil 11 and the electronic device 14 and between the spiral coil 11 and the circuit board 15 as described above. Thus, the magnetic flux interlinked with the circuit board 15 and the like in the electronic apparatus 1 is decreased, and it becomes possible to prevent the generation of the eddy current due to electromagnetic induction.

Therefore, the generation of heat due to the eddy current of the electronic device 14 and the rectifier 12 mounted on the circuit board 15, the generation of heat in the circuit of the circuit board 15, and the generation of noise due to the eddy current can be suppressed. The suppression of the generation of heat in the electronic apparatus 1 contributes to improvement of the performance and reliability of the secondary battery 13. Besides, the suppression of the generation of heat due to the eddy current can increase the electric power to be fed to the power receiving device 2. Since the magnetic foil 16 also functions as a magnetic core of the spiral coil 11, the power reception efficiency and also the charging efficiency can be enhanced. And, they contribute to a decrease of the charging time of the electronic apparatus 1.

For the magnetic foil 16, there is used a magnetic alloy ribbon, a magnetic alloy thin sheet, or the like. To the magnetic foil 16, various types of soft magnetic materials can be applied. Specific structures of the magnetic foil 16 include the following. The magnetic alloy ribbon is preferably formed of a Co-based amorphous alloy, an Fe-based amorphous alloy or an Fe-based microcrystalline alloy. Such magnetic materials can be produced by a roll quenching method (single roll or double roll), so that a ribbon having an average thickness of 50 μm or less can be obtained with ease.

The amorphous alloy forming the magnetic alloy ribbon preferably has a composition represented by a general formula:

$$(T_{1-a}M_a)_{100-b}X_b \quad (1)$$

(wherein, T represents at least one element selected from Co and Fe, M represents at least one element selected from Ni, Mn, Cr, Ti, Zr, Hf, Mo, V, Nb, W, Ta, Cu, Ru, Rh, Pd, Os, Ir, Pt, Re and Sn, X represents at least one element selected from B, Si, C and P, and a and b are numbers satisfying $0 \leq a \leq 0.3$, $10 \leq b \leq 35$ at %). In the formula (1), if the element T contains both Co and Fe, it is called a Co-based amorphous alloy when Co is large in amount and called an Fe-based amorphous alloy when Fe is large in amount.

In the formula (1), the composition ratio of the element T is adjusted depending on the required magnetic properties such as a flux density, a magnetostriction value, an iron loss, and the like. The element M is an element added to control thermal stability, corrosion resistance and crystallization temperature. The added amount of the element M is preferably 0.3 or less as value a. If the added amount of the element M is excessively large, the amount of the element T decreases relatively, so that the magnetic characteristics of the amorphous magnetic alloy ribbon are lowered. The value a indicating the added amount of the element M is preferably 0.01 or more for practical purposes. The value a is more preferably 0.15 or less.

The element X is an element essential to obtain an amorphous alloy. Especially, B (boron) is an element effective to make a magnetic alloy amorphous. Si (silicon) is an element effective to assist the formation of an amorphous phase and to increase a crystallization temperature. If the content of the element X is excessively large, a magnetic permeability lowers and brittleness is generated, and if it is excessively small, it becomes hard to make it amorphous. Accordingly, the content of the element X is preferably in a range of 10 to 35 at %. The content of the element X is more preferably in a range of 15 to 25 at %.

The Fe-based microcrystalline alloy ribbon is formed of an Fe-based alloy having a composition substantially represented by a general formula:

$$Fe_{100-c-d-e-f-g-h}A_c D_d E_e Si_f B_g Z_h \quad (2)$$

(wherein, A represents at least one element selected from Cu and Au, D represents at least one element selected from Ti, Zr, Hf, V, Nb, Ta, Cr, Mo, W, Ni, Co and rare earth elements, E represents at least one element selected from Mn, Al, Ga, Ge, In, Sn and platinum group elements, Z represents at least one element selected from C, N and P, and c, d, e, f, g and h are numbers satisfying $0.01 \leq c \leq 8$ at %, $0.01 \leq d \leq 10$ at %, $0 \leq e \leq 10$ at %, $10 \leq f \leq 25$ at %, $3 \leq g \leq 12$ at % and $15 \leq f+g+h \leq 35$ at %) in which 20% or more in an area ratio of the metal texture is comprised of microcrystalline grains having a particle diameter of 50 nm or less.

In the formula (2), the element A is an element which enhances corrosion resistance, prevents coarsening of crystal grains, and improves magnetic characteristics such as iron loss, magnetic permeability and the like. If the content of the element A is excessively small, a sufficient effect of suppression of coarsening of the crystal grains cannot be obtained, and if it is excessively large, the magnetic characteristics are degraded. Therefore, the content of the element A is preferably determined to fall in a range of 0.01 to 8 at %. The element D is an element effective to uniformize the crystal grain diameter, to decrease magnetostriction and the like. The content of the element D is preferably determined to fall in a range of 0.01 to 10 at %.

The element E is an element effective to improve soft magnetic characteristics and corrosion resistance. The content of the element E is preferably 10 at % or less. Si and B are elements to assist in making the alloy amorphous at the time of producing the ribbon. The content of Si is preferably determined to fall in a range of 10 to 25 at %, and the content of B is preferably determined to fall in a range of 3 to 12 at %. The element Z may be contained as the element of assisting in making the elements other than Si and B amorphous. In such a case, the total content of the elements Si, B and Z is preferably determined to fall in a range of 15 to 35 at %. The microcrystalline structure is preferable to take a mode in which crystal grains having a particle diameter particularly in a range of 5 to 30 nm exist in the alloy with an area ratio of 50 to 90%.

For example, the amorphous alloy ribbon is produced by a roll quenching method (molten-metal-quenching method). Specifically, it is produced by quenching an alloy material adjusted to have a prescribed composition ratio from its molten state. The microcrystalline alloy ribbon can be obtained by producing an amorphous alloy ribbon by, for example, a liquid quenching method and performing a heat treatment at a temperature in a range of −50 to +120° C. for one minute to 5 hours against the crystallization temperature to deposit microcrystalline grains. The microcrystalline alloy ribbon can also be obtained by a method of directly depositing the microcrystalline grains by controlling a quenching rate of the liquid quenching method.

The magnetic alloy ribbon formed of the amorphous alloy or the Fe-based microcrystalline alloy is preferable to have an average thickness in a range of 5 to 50 μm. The magnetic alloy ribbon having an average thickness of 50 μm or less has an advantage that the bent portion and the open portion described later can be formed easily. If the average thickness of the magnetic alloy ribbon exceeds 50 μm, magnetic permeability lowers, and its loss might become large. If the average thickness of the magnetic alloy ribbon is less than 5 μm, no more effect can be obtained, but the production cost is increased. The thickness of the magnetic alloy ribbon is more preferably in a range of 5 to 35 μm, and still more preferably in a range of 10 to 25 μm.

The magnetic foil 16 may be formed of permalloy, a silicon steel plate or the like instead of the amorphous alloy or the Fe-based microcrystalline alloy. In such a case, a melted ingot or a sintered ingot is undergone forging, rolling or the like to produce a thin sheet. It is preferable that a magnetic alloy thin sheet formed of permalloy, silicon steel plate or the like has a thickness in a range of 10 to 40 μm. If the magnetic alloy thin sheet has a thickness of exceeding 40 μm, a loss within a magnetic plate due to the eddy current is increased. Meanwhile, if the magnetic alloy thin sheet has a thickness of less than 10 μm, a sufficient shield effect cannot be obtained. It is more preferable that the magnetic alloy thin sheet has a thickness in a range of 10 to 25 μm.

The above-described magnetic foil 16 has a characteristic that an Ms·t value expressed by the product of a saturation flux density Ms and a thickness t is 15 or more. The Ms is a saturation flux density of the magnetic foil 16, and the t is a thickness [μm] of the magnetic foil 16. In a case where the magnetic foil 16 is comprised of a stacked body of plural foil bodies, it is determined that the thickness t indicates a total thickness of the plural foil bodies. In a case where the foil body-stacked body is applied partially, the thickness t indicates the thickness (total thickness) of the portion where the foil bodies were stacked in the largest number. In a case where plural magnetic foil bodies are stacked via a nonmagnetic layer such as an insulating layer or the like, the thickness of the nonmagnetic layer is not contained in the thickness t.

Since the magnetic foil 16 having the Ms·t value of 15 or more has a good shield effect, a magnetic flux is suppressed from leaking from the magnetic foil 16. By suppressing the leakage of the magnetic flux from the magnetic foil 16, the eddy current can be suppressed from generating in the rectifier 12, the electronic device 14, the circuit board 15 or the like. Thus, it becomes possible to suppress the heat generation within the electronic apparatus 1. Especially, when the power receiving speed is determined to be 0.25 W/h or more, the shield effect of the magnetic flux suited to the power receiving speed can be improved. The power reception efficiency by the power receiving coil 11 can be improved by suppressing the leakage of the magnetic flux from the magnetic foil 16. The heat generation within the electronic apparatus 1 can also be suppressed.

For example, it is necessary to increase the power to be transmitted in order to charge a secondary battery having a large charging capacity such as the Li ion secondary battery. It means that the magnetic flux amount to be transmitted is increased according to the non-contact charging method. It becomes possible to shield the increased magnetic flux without fail by using the magnetic foil 16 having the Ms·t value of 15 or more. Therefore, it becomes possible to suppress the heat generation within the electronic apparatus 1 due to the eddy current without fail. Meanwhile, if the Ms·t value of the magnetic foil 16 is less than 15, the magnetic flux shield effect becomes insufficient, so that the flux leakage is increased to have a large temperature increase due to the eddy current.

The magnetic foil 16 having the Ms·t value of 15 or more is suitable when the Li ion secondary battery having a large charging capacity is applied to the secondary battery 13. Especially, the magnetic foil 16 is effective when the power receiving speed is determined to be 0.25 W/h or more. The Ms·t value of the magnetic foil 16 is more preferably 25 or more. In addition, to enhance the power reception efficiency of the power receiving coil 11, the magnetic foil 16 preferably has a characteristic that a $\mu r' \cdot t$ value, which is expressed by the product of a thickness t and a real component $\mu r'$ of relative permeability, is 40000 or more. The real component $\mu r'$ is a real component of relative permeability of the magnetic foil 16.

When the $\mu r' \cdot t$ value is 40000 or more, the magnetic foil 16 has a large inductance, so that the magnetic foil 16 becomes hard to be magnetically saturated by the eddy current. Since flux leakage from the magnetic foil 16 is suppressed regardless of the saturation or non-saturation of the magnetic foil 16, eddy current to be generated in the rectifier 12, the electronic device 14, the circuit board 15 or the like can be suppressed. Thus, heat generation within the electronic apparatus 1 can be further suppressed. When the inductance of the magnetic foil 16 is increased, the power reception efficiency by the power receiving coil 11 can be improved. Thus, the heat generation due to the eddy current can also be suppressed.

When the $\mu r' \cdot t$ value of the magnetic foil 16 is less than 40000, an eddy current suppressing effect becomes insufficient, so that if transmission power becomes 1 W·h or more, the secondary battery 13 generates heat more than necessary. It is because the magnetic properties of the magnetic foil 16 are saturated by the eddy current generated at the time of power reception, and the eddy current cannot be suppressed further more. The magnetic foil 16 having the $\mu r' \cdot t$ value of 40000 or more is suitable when the Li ion secondary battery having a large charging capacity is applied to the secondary battery 13. Especially, the magnetic foil 16 having the $\mu r' \cdot t$ value of 40000 or more is effective to have a power receiving speed of 0.25 W/h or more. The $\mu r' \cdot t$ value is more preferably 90000 or more.

To increase the Ms·t value, the saturation flux density Ms of the magnetic foil 16 is increased or the thickness t is increased. As a method of increasing the saturation flux density Ms of the magnetic foil 16, a material composition having a large saturation flux density is applied to the magnetic foil 16. The $\mu r' \cdot t$ value is also increased by the same manner, and the real component $\mu r'$ of the relative permeability of the magnetic foil 16 is increased or the thickness t is increased by the material composition or a heat treatment. It is effective that the magnetic foil 16 formed of an amorphous magnetic alloy ribbon is subjected to a heat treatment at temperatures of 200° C. to (crystallization temperature −10° C.) for 10 to 120 minutes. The conditions are appropriately combined and applied. The saturation flux density Ms of the magnetic foil 16 is preferably 0.5 T or more in view of suppression of an excess increase of the thickness t. Similarly, the real component $\mu r'$ of the relative permeability of the magnetic foil 16 is preferably 120 or more.

If the magnetic foil 16 has an excessive average thickness, magnetic permeability and workability of the magnetic foil 16 are degraded as described above. Therefore, it is preferable that the average thickness of the magnetic foil 16 is in the above-described range. To increase the thickness t with the above-described conditions satisfied, it is preferable to apply a stacked body of magnetic alloy ribbons or magnetic alloy thin sheets to the magnetic foil 16. Since the magnetic alloy ribbons or the magnetic alloy thin sheets are stacked, the thickness t of the magnetic foil 16 can be increased while the thickness of the individual ribbons or thin sheets is suppressed from increasing. Thus, the magnetic foil 16 having the Ms·t value of 15 or more and also the magnetic foil 16 having the $\mu r' \cdot t$ value of 40000 or more can be obtained.

In addition, it is preferable that an electric resistance value R [$\Omega \cdot m$] of the magnetic foil 16 satisfies $R \cdot \mu r' \geq 1.01 \times 10^{-3}$. Even if the thickness of the magnetic foil 16 is determined to be larger than the skin depth thickness according to a skin effect, the excessively larger part does not substantially exert an effect as the magnetic body. Therefore, the thickness of the magnetic foil 16 is preferably determined to be not larger than the skin depth thickness. The above-described $R \cdot \mu r'$ value is determined from $(\mu_0 \cdot \mu r' \cdot \delta) = (\mu_0 \cdot \mu r')(2 \cdot R/(\mu_0 \cdot \mu r' \cdot \omega))^{1/2} \geq (\mu_0 \cdot \mu r' \cdot t) = \mu_0 \cdot 40000$ on the basis of skin depth thickness=$\delta$, $\mu r' \cdot t = 40000$, $\mu_0 =$ vacuum magnetic permeability=$4\pi \times 10^{-7}$, thickness=t and $\omega$=angular frequency. It means that when a material has a low magnetic permeability, sufficient $\mu_0 \cdot r'$ cannot be obtained, and heat generation cannot be suppressed sufficiently.

Figure 4:
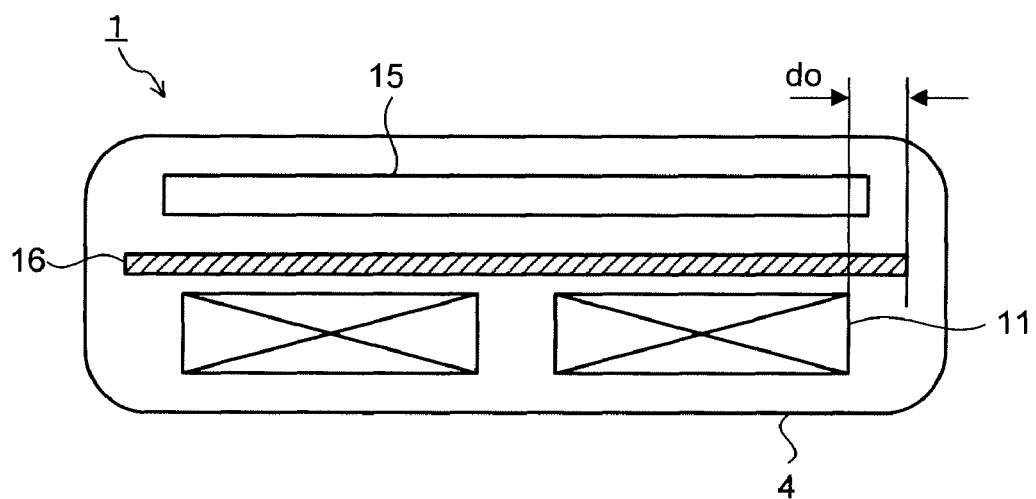
FIG. 4 is a sectional view showing an example of providing a protruded portion on an outer peripheral portion of a magnetic foil according to an embodiment of the present invention.

A method and structure for further suppression of a problem due to the eddy current are described below. As shown in FIG. 4, the magnetic foil 16 preferably has its outer peripheral edge extended to the outside of the outer peripheral portion of the spiral coil 11. In FIG. 4, do indicates a portion (protruded portion) of the magnetic foil 16 protruded externally from the spiral coil 11. By configuring as described above, the magnetic flux generated in the spiral coil 11 can be blocked more effectively by the magnetic foil 16. It contributes greatly to the suppression of the eddy current based on the magnetic flux interlinked with the board and the like and also to the suppression of the heat generation due to the eddy current and a decrease in the power reception efficiency.

Figure 5:
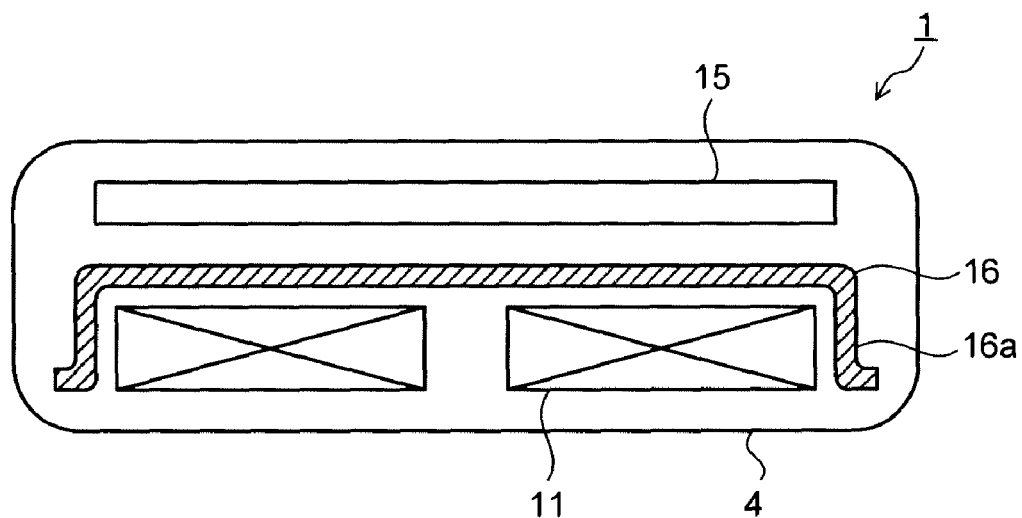
FIG. 5 is a sectional view showing another example of providing a protruded portion on the outer peripheral portion of the magnetic foil according to the embodiment of the present invention.
Figure 6:
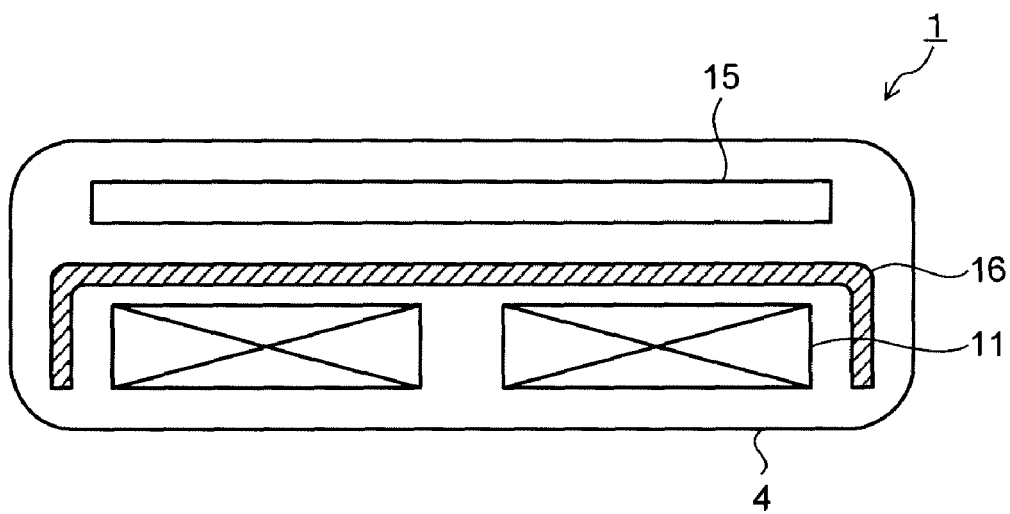
FIG. 6 is a sectional view showing still another example of providing a protruded portion on the outer peripheral portion of the magnetic foil according to the embodiment of the present invention.

As shown in FIG. 5 and FIG. 6, the protruded portion do of the magnetic foil 16 may be bent toward the side (on the side of the spiral coil 11) opposite to the circuit board 15. In FIG. 5 and FIG. 6, the magnetic foil 16 has a bent portion 16a which is formed by bending its outer peripheral edge toward the opposite side from the circuit board 15. The bent portion 16a may be bent plural times as shown in FIG. 5 or one time as shown in FIG. 6. The outer peripheral portion of the magnetic foil 16 can be bent toward the spiral coil 11 to further enhance the eddy current suppressing effect.

Besides, the magnetic foil 16 also functions as the magnetic core of the spiral coil 11. In this case, the outer peripheral of the magnetic foil 16 can be bent toward the spiral coil 11 to decrease the gap between the magnetic foil 16 as the magnetic core and the power feeding coil (primary coil). Thus, it becomes possible to enhance the power reception efficiency. At this time, the magnetic foil 16 which is close to the power feeding coil has a greater effect if it has a larger area. Therefore, as shown in FIG. 5, the magnetic circuit can be formed more effectively to enhance the power reception efficiency by directing the outer peripheral edge of the magnetic foil 16 to a direction substantially parallel to the normal of the winding surface of the power feeding coil.

Figure 7:
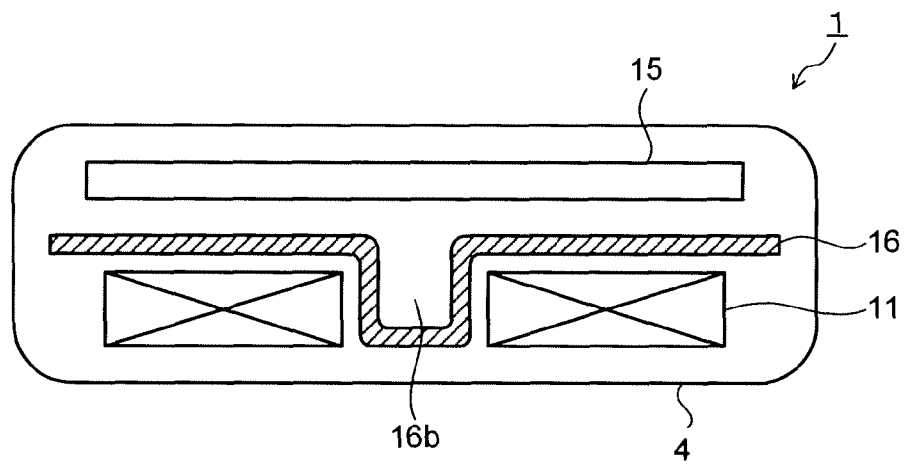
FIG. 7 is a sectional view showing an example of providing an open portion at the center of a magnetic foil according to an embodiment of the present invention.
Figure 8:
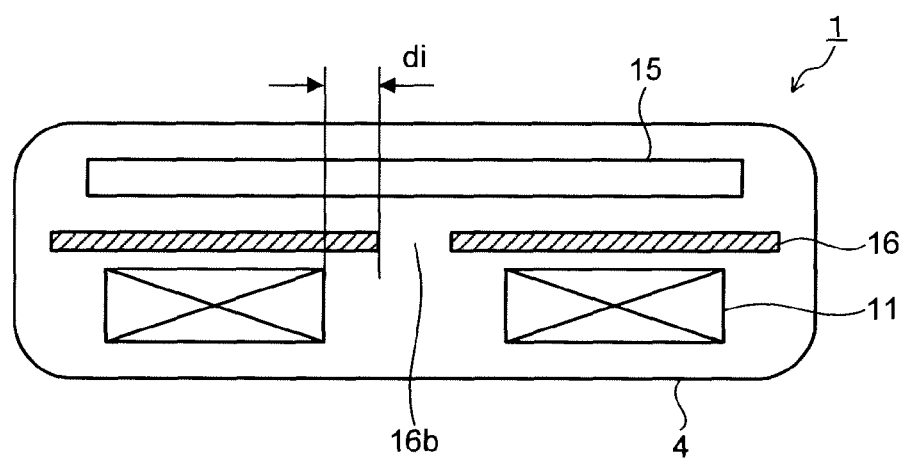
FIG. 8 is a sectional view showing another example of providing an open portion at the center of the magnetic foil according to the embodiment of the present invention.
Figure 9:
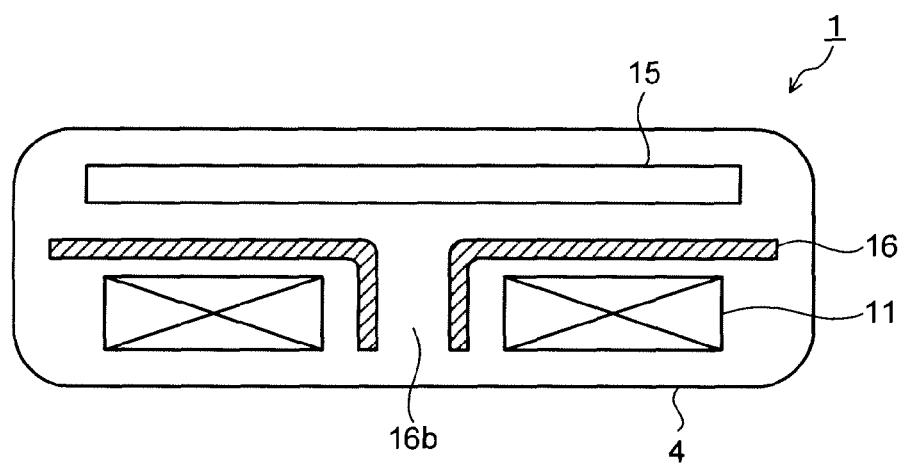
FIG. 9 is a sectional view showing another example of providing an open portion at the center of the magnetic foil according to the embodiment of the present invention.

An open portion 16b may be formed at the center of the magnetic foil 16 as shown in FIG. 7, FIG. 8 and FIG. 9. The open portion 16b of the magnetic foil 16 is provided at a position corresponding to the center of the spiral coil 11. The shape of the open portion 16b includes a shape (downward projected shape) that the center of the magnetic foil 16 is recessed toward the spiral coil 11 as shown in FIG. 7, a shape that a hole is formed in the center of the magnetic foil 16 as shown in FIG. 8, and a shape that the center of the magnetic foil 16 is bent as shown in FIG. 9. The open portion 16b can be formed to decrease the gap against the power feeding coil (primary coil), so that the magnetic circuit can be formed more effectively to enhance the power reception efficiency.

In FIG. 8, di denotes a portion of the magnetic foil 16, which is present inside of the spiral coil 11. The bent portion shown in FIG. 9 is obtained by bending the portion di, which is present inside of the spiral coil 11 of the magnetic foil 16, toward the spiral coil 11. The structure that the outer peripheral portion of the magnetic foil 16 is protruded to the outside of the spiral coil 11 and the structure that the open portion is formed at the center may be used independently or together. Adoption of both of these structures exerts a greater effect of improving the power reception efficiency. In FIG. 4 through FIG. 9, the rectifier 12, the secondary battery 13 and the electronic device 13 are omitted. The same is also applied to FIG. 15.

Besides, it is preferable to provide slits in the magnetic foil 16 in order to suppress the eddy current in the magnetic foil 16. It is more effective to divide the magnetic foil 16 into plural by the slits so as to cut off an electrical path (or a current path). Examples of the magnetic foil 16 provided with the slits are shown in FIG. 10 through FIG. 14. In these drawings, numeral 17 denotes the slits. The slits 17 cutting the magnetic foil 16 correspond to the dividing lines of the magnetic foil 16.

Figure 10:
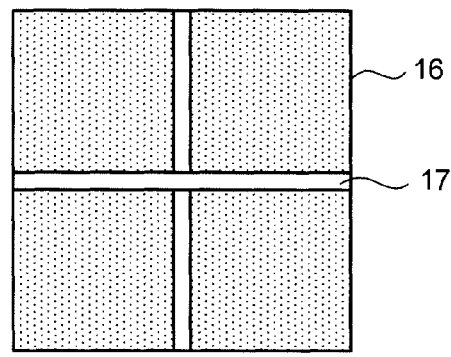
FIG. 10 is a plan view showing an example of forming slits in a magnetic foil according to an embodiment of the present invention.
Figure 11:
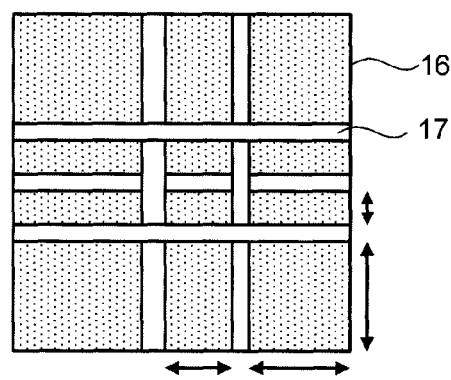
FIG. 11 is a plan view showing another example of forming slits in the magnetic foil according to the embodiment of the present invention.
Figure 12:
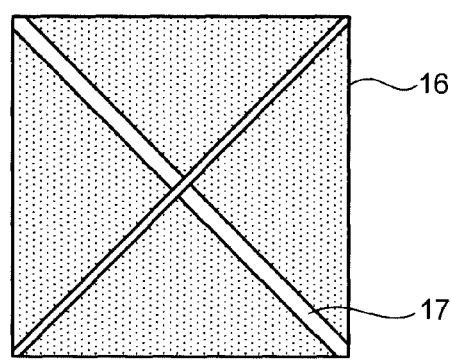
FIG. 12 is a plan view showing still another example of forming slits in the magnetic foil according to the embodiment of the present invention.

FIG. 10 shows a state that the slits 17 are formed vertically and horizontally in the magnetic foil 16 to intersect mutually at right angles. The magnetic foil 16 shown in FIG. 10 is divided into four. FIG. 11 shows a state that the plural slits 17 are formed in the magnetic foil 16 vertically and horizontally. As shown in FIG. 11, in a case where the plural slits 17 are formed, the sizes of the slits 17 and the intervals of the slits 17 are arbitrary. FIG. 12 shows a state that the slits 17 are formed to intersect at right angles in diagonal directions of the magnetic foil 16. Thus, the slits 17 are not limited to the horizontal and vertical formation but may also be formed to have an angle. It is not shown but the slits may be formed radially.

Figure 13:
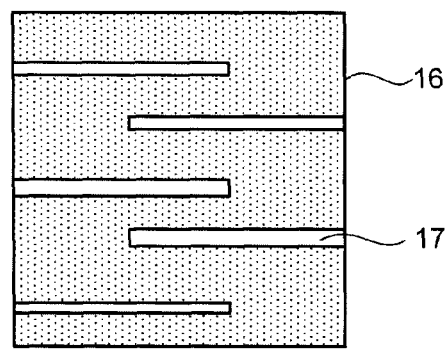
FIG. 13 is a plan view showing still another example of forming slits in the magnetic foil according to the embodiment of the present invention.
Figure 14:
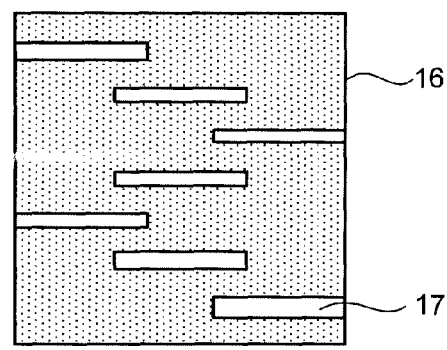
FIG. 14 is a plan view showing still another embodiment of forming slits in the magnetic foil according to the embodiment of the present invention.

FIG. 13 shows a state that the slits 17 are formed from one end to the midpoints of the magnetic foil 16. The slits 17 are formed from both opposed ends to the other ends. FIG. 14 shows a state that the slits 17 are formed from both ends to the midpoints of the magnetic foil 16, and the slits 17 are also formed around the center portions. When the electrical path is cut off, the magnetic flux becomes larger toward the center of the spiral coil 11, so that it is effective to dispose the slits 17 such that the area of the magnetic foil 16 divided becomes smaller toward the center. But, when the number of the slits (division number) is increased, magnetic resistance increases, so that the power reception efficiency is decreased. Therefore, the slits 17 are preferably provided considering both the eddy current suppressing effect and the power reception efficiency.

Figure 15:
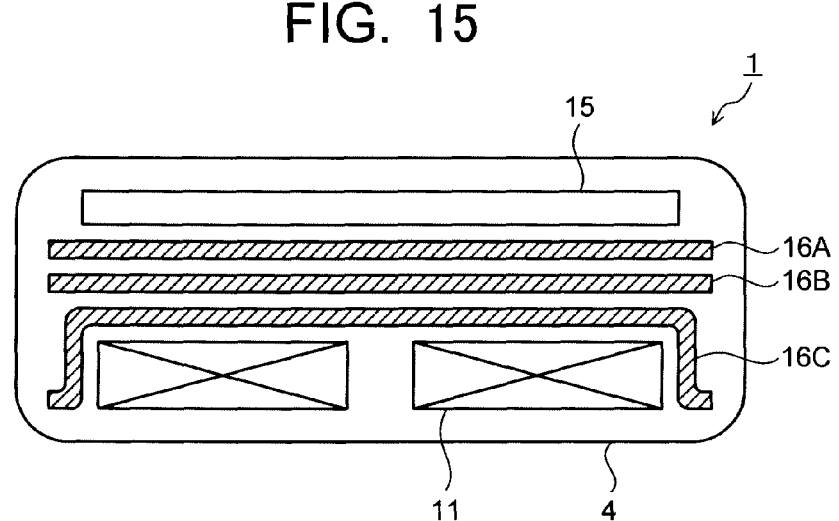
FIG. 15 is a sectional view showing an example of providing plural magnetic foil bodies in an electronic apparatus according to an embodiment of the present invention.

To improve both the eddy current suppressing effect and the power reception efficiency, plural magnetic foil bodies are effectively used. An example of using the plural magnetic foil bodies is shown in FIG. 15. In the electronic apparatus 1 shown in FIG. 15, three magnetic foil bodies 16A, 16B, 16C are disposed between the spiral coil 11 and the circuit board 15. The magnetic foil 16A has the slits 17 shown in FIG. 10. The magnetic foil 16B has the slits 17 shown in FIG. 11. The magnetic foil 16C does not have a slit but has its outer peripheral portion bent.

Thus, the use of both the magnetic foil 16C provided with the bent portion 16a and the magnetic foil bodies 16A, 16B provided with the slits 17 enables to enhance both the eddy current suppressing effect and the power reception efficiency. The magnetic foil 16 provided with the slits 17 may be combined with the magnetic foil 16 provided with the open portion 16b, and the magnetic foil 16 provided with both the bent portion 16a and the open portion 16b may be combined with the magnetic foil 16 having the slits 17. In a case where three or more (n or more) magnetic foil bodies 16 are used, two ((n−1) of them) may be determined as the magnetic foil bodies 16 having the same shape (structure), and all of three (n) magnetic foil bodies 16 may have the same structure.

The above-described power receiving device 2 of the embodiment and the electronic apparatus 1 using it can decrease the heat generation within the device and improve the power reception efficiency because the eddy current due to the magnetic flux interlinked with the spiral coil 11 is suppressed. Thus, the electric power at the time of power supplying can be increased, and the charging time can be decreased accordingly. The electronic apparatus 1 of this embodiment is suitable for cellular phones, portable audio devices, digital cameras, game machines and the like. The electronic apparatus 1 is set on a power feeding device to perform non-contact charging.

Figure 16:
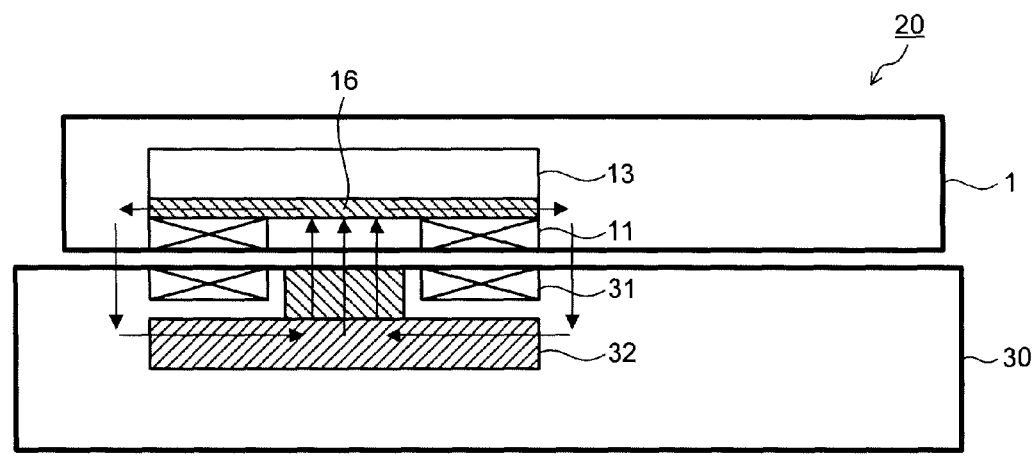
FIG. 16 is a diagram showing a structure of a non-contact charger according to an embodiment of the present invention.
Figure 17:
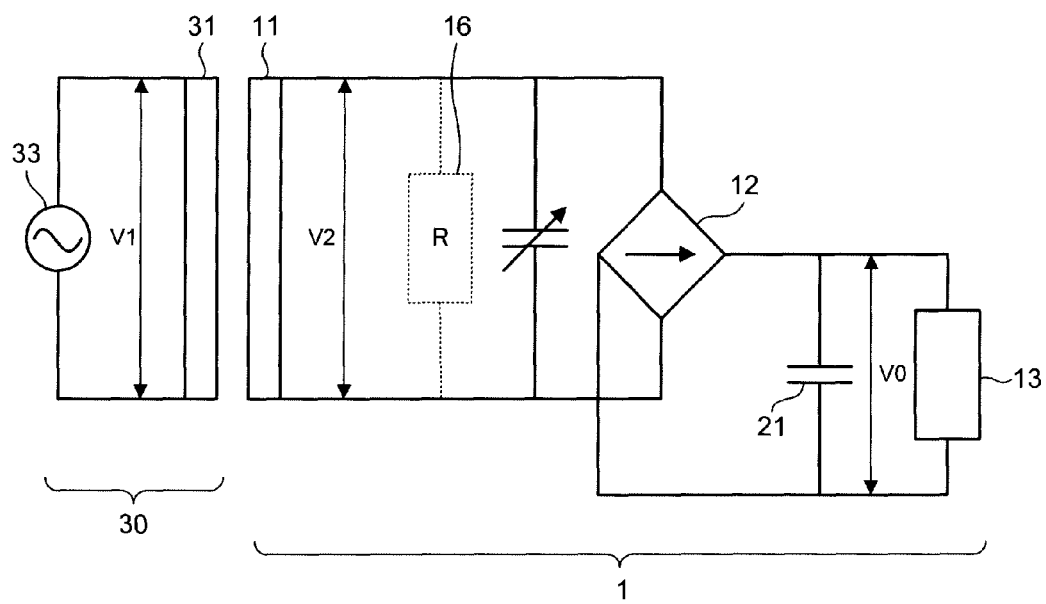
FIG. 17 is a circuit diagram of the non-contact charger shown in FIG. 16.

FIG. 16 shows a structure of a non-contact charger according to an embodiment of the present invention. FIG. 17 is a circuit diagram of the non-contact charger shown in FIG. 16. In a non-contact charger 20 shown in FIG. 16 and FIG. 17, the electronic apparatus 1 is the one described in the above-described embodiment. In FIG. 16, arrows indicate flows of magnetic flux. In FIG. 17, numeral 21 denotes a capacitor for smoothing. A power feeding device 30 is provided with a power feeding coil 31, a magnetic core 32 for the power feeding coil and a power supply 33 for applying an AC voltage to the power feeding coil 31. When the electronic apparatus 1 is set on the power feeding device 30, the power feeding coil 31 is arranged in no contact with the power receiving coil 11.

Charging is performed by the non-contact charger 20 as follows. First, the AC voltage is applied from the power supply 33 to the power feeding coil 31 of the power feeding device 30 to generate magnetic flux in the power feeding coil 31. The magnetic flux generated in the power feeding coil 31 is transmitted to the power receiving coil 11 which is disposed in no contact with the power feeding coil 31. The power receiving coil 11 receives the magnetic flux, and AC voltage is generated by electromagnetic induction. The AC voltage is rectified by the rectifier 12. The AC voltage rectified by the rectifier 12 is charged to the secondary battery 13. Thus, the non-contact charger 20 performs non-contact transmission of power.

Specific examples of the invention and their evaluated results will be described below.

(Charging System)

As a non-contact charging system, a charging system for a cellular phone was prepared. A power feeding device has a first coil (power feeding coil), which converts the power received from the AC power supply into a prescribed electromagnetic wave through a control circuit and transmits the electromagnetic wave, provided near a cradle. The cellular phone is provided with a secondary coil (power receiving coil) comprising a spiral coil as the power receiving device, a circuit board on which a rectifier for rectifying the AC power generated in the secondary coil is mounted, and a secondary battery (Li ion secondary battery). The secondary coil has a copper wire wound in a planar state having an outer periphery of 30 mm and an inner periphery of 23 mm.

COMPARATIVE EXAMPLE 1

For the above-described cellular phone, a magnetic foil was not used to configure the power receiving device. The cellular phone and a non-contact charger using the power receiving device were determined as Comparative Example 1.

EXAMPLE 1

As a magnetic foil, an amorphous alloy ribbon having a saturation flux density Ms of 0.55, a real component µr' of 18000 of a relative permeability, an average thickness of 9.5 µm, and a composition of $Co_{70}Fe_5Si_5B_{20}$ (atomic ratio) was prepared. The amorphous alloy ribbon was heat treated under conditions of 440° C.×30 min. The amorphous alloy ribbon had a shape that a protruded amount do of an outer peripheral portion was 6 mm. Three of the amorphous alloy ribbons were stacked and disposed between the secondary coil (power receiving coil 11) and the secondary battery 13 as shown in FIG. 1. A cellular phone and a non-contact charger using a power receiving device having the above magnetic foil were determined as Example 1.

EXAMPLES 2 AND 3

Power receiving devices were configured in the same manner as in Example 1 using the amorphous alloy ribbon having the same composition as in Example 1, except that the heat treatment conditions, the average thickness and the stacked number were changed to the conditions shown in Table 1. Cellular phones and non-contact chargers using the above power receiving devices were determined as Examples 2 and 3.

EXAMPLES 4 TO 7

As a magnetic foil, an amorphous alloy ribbon having a composition of $Fe_{78}Si_8B_{14}$ (atomic ratio) was prepared. The heat treatment conditions, the average thickness, the stacked number of the amorphous alloy ribbons are as shown in Table 1. Power receiving devices were configured in the same manner as in Example 1, except that the obtained amorphous alloy ribbons were used. Cellular phones and non-contact chargers using the above power receiving devices were determined as Examples 4 to 7.

EXAMPLE 8

As a magnetic foil, a permalloy thin sheet having an average thickness of 25 µm and a composition of $Fe_{78}Ni_{22}$ (atomic ratio) was prepared. The permalloy thin sheet was heat treated in a hydrogen atmosphere. The heat treatment conditions were determined as 1200° C.×30 min.→annealing at 100° C./h→600° C.×60 min.→100° C./h. A power receiving device was configured in the same manner as in Example 1, except that the obtained permalloy thin sheet was used. A cellular phone and a non-contact charger using the power receiving device were determined as Example 8.

EXAMPLES 9 AND 10

As a magnetic foil, an Fe-based microcrystalline alloy ribbon having a composition of $F_{74}Cu_1Ni_1Mn_1Si_{15}B_8$ (atomic ratio) was prepared. The Fe-based microcrystalline alloy ribbon is comprised of microcrystalline grains in which 95% (area ratio) of the metal texture is comprised of the microcrystalline grains having a particle diameter of 40 nm or less. Power receiving devices were configured in the same manner as in Example 1, except that the obtained Fe-based microcrystalline alloy ribbon was used as a single layer or as a three-stacked layer. Cellular phones and non-contact chargers using the above power receiving devices were determined as Examples 9 and 10.

EXAMPLE 11

As a magnetic foil, a silicon steel plate containing 3 mass % of Si and the balance of substantially Fe was prepared. The silicon steel plate had an average thickness of 200 µm. A power receiving device was configured in the same manner as in Example 1, except that the obtained silicon steel plate was used. A cellular phone and a non-contact charger using the above power receiving device were determined as Example 11.

COMPARATIVE EXAMPLES 2 TO 7

Power receiving devices were configured in the same manner as in Example 1, except that the amorphous alloy ribbon having the same composition as in Example 1 was used, and the heat treatment conditions, the average thickness and the stacked number were changed to the conditions shown in Table 1. Every magnetic foil had an Ms·t value of less than 15. Cellular phones and non-contact chargers using the above power receiving devices were determined as Comparative Examples 2 to 7.

COMPARATIVE EXAMPLES 8 TO 10

As a magnetic foil, an amorphous alloy ribbon having a composition of $Co_{76}Fe_4Ni_3Si_6B_{11}$ (atomic ratio) was prepared. The heat treatment conditions, the average thickness, and the stacked number of the amorphous alloy ribbons are as shown in Table 1. Every amorphous alloy ribbon had an Ms·t value of less than 15. Each power receiving device was configured in the same manner as in Example 1, except that the above amorphous alloy ribbons were used. Cellular phones and non-contact chargers using the above power receiving devices were determined as Comparative Examples 8 to 10.

COMPARATIVE EXAMPLE 11

A magnetic sheet was produced by forming a thin film having a composition of $Co_{65}Zr_{19}Nb_{16}$ (atomic ratio) on a resin film by a sputter method. The magnetic sheet had an Ms·t value of less than 15. The power receiving device was configured in the same manner as in Example 1, except that the obtained magnetic sheet was used. A cellular phone and a non-contact charger using the above power receiving device were determined as Comparative Example 11.

The Ms·t values and µr'·t values of Examples 1 to 11 and Comparative Examples 1 to 11 described above are shown in Table 2. A coupling efficiency and a heat generation amount of the non-contact charger of the individual examples were measured and evaluated. The evaluated results are shown in Table 2.

The coupling efficiency was evaluated based on how much electric power could be transmitted to the secondary coil (power receiving coil) when a prescribed level of power (1 W here) was transmitted from the primary coil (power feeding coil). Based on the coupling efficiency (amount of electric power transmitted to the secondary coil) of Comparative Example 1 taken as 100, it was indicated by ○ when the improvement was increased by 20% or more (120 or more and less than 140), ⊚ when the improvement was increased by 40% or more (140 or more), and x when the improvement was increased by less than 20% (less than 120).

As for the heat generation amount, power transmission was performed at individual power transmission speeds of 0.4 W/h and 1.5 W/h for two hours, and a temperature increase after two hours was measured. A temperature increase by 25° C. or less was indicated by ⊚, a temperature increase by over 25° C. and 40° C. or less was indicated by ○, and a temperature increase by over 40° C. was indicated by x. The temperature before the power transmission was standardized at room temperature (25° C.). It was determined that the power receiving speed was 0.25 W/h when the power transmission speed was 0.4 W/h, and 0.9 W/h when the power transmission speed was 1.5 W/h.

TABLE 1

| | Composition | Heat treatment | Ms [T] | μr' | Thickness [μm] | Stacked number |
|---|---|---|---|---|---|---|
| Example 1 | $Co_{70}Fe_5Si_5B_{20}$ | 440° C. × 30 min | 0.55 | 18000 | 9.5 | 3 |
| Example 2 | $Co_{70}Fe_5Si_5B_{20}$ | None | 0.55 | 19000 | 18.5 | 3 |
| Example 3 | $Co_{70}Fe_5Si_5B_{20}$ | None | 0.55 | 19000 | 18.5 | 2 |
| Example 4 | $Fe_{78}Si_8B_{14}$ | None | 1.44 | 5000 | 24 | 1 |
| Example 5 | $Fe_{78}Si_8B_{14}$ | 200° C. × 30 min | 1.44 | 6000 | 24 | 1 |
| Example 6 | $Fe_{78}Si_8B_{14}$ | 440° C. × 30 min | 1.44 | 8000 | 24 | 1 |
| Example 7 | $Fe_{78}Si_8B_{14}$ | None | 1.44 | 4000 | 24 | 3 |
| Example 8 | Permalloy | 1200 × 30 min →600 × 60 min | 0.87 | 8000 | 25 | 3 (25 × 3) |
| Example 9 | Fe-based microcrystalline alloy | None | 1.36 | 20000 | 22 | 1 |
| Example 10 | Fe-based microcrystalline alloy | None | 1.36 | 20000 | 22 | 3 |
| Example 11 | Silicon steel plate | None | 2 | 300 | 200 | 1 |
| Comparative Example 1 | None | — | 0.55 | 1 | — | 0 |
| Comparative Example 2 | $Co_{70}Fe_5Si_5B_{20}$ | None | 0.55 | 5000 | 18 | 1 |
| Comparative Example 3 | $Co_{70}Fe_5Si_5B_{20}$ | 200° C. × 30 min | 0.55 | 6000 | 18 | 1 |
| Comparative Example 4 | $Co_{70}Fe_5Si_5B_{20}$ | 440° C. × 30 min | 0.55 | 19000 | 18 | 1 |
| Comparative Example 5 | $Co_{70}Fe_5Si_5B_{20}$ | 440° C. × 30 min | 0.55 | 18000 | 9.5 | 1 |
| Comparative Example 6 | $Co_{70}Fe_5Si_5B_{20}$ | 440° C. × 30 min | 0.55 | 17000 | 5 | 1 |
| Comparative Example 7 | $Co_{70}Fe_5Si_5B_{20}$ | 440° C. × 30 min | 0.55 | 17000 | 5 | 3 |
| Comparative Example 8 | $Co_{76}Fe_4Ni_3Si_6B_{11}$ | None | 0.55 | 4000 | 25 | 1 |
| Comparative Example 9 | $Co_{76}Fe_4Ni_3Si_6B_{11}$ | 200° C. × 30 min | 0.55 | 5500 | 25 | 1 |
| Comparative Example 10 | $Co_{76}Fe_4Ni_3Si_6B_{11}$ | 440° C. × 30 min | 0.55 | 7000 | 25 | 1 |
| Comparative Example 11 | (Sputtered film) | None | 2 | 3300 | 6 | 1 |

TABLE 2

| | Magnetic foil | | Evaluated results | | |
| | | | | Heat generation(Power transmission speed*) | |
| | Ms · t [T · μm] | ur' · t [μm] | Coupling | 0.4 W/h | 1.5 W/h |
|---|---|---|---|---|---|
| Example 1 | 15.675 | 513000 | ⊚ | ○ | X |
| Example 2 | 30.525 | 1054500 | ⊚ | ⊚ | ⊚ |
| Example 3 | 20.35 | 703000 | ⊚ | ○ | X |
| Example 4 | 34.56 | 120000 | ⊚ | ⊚ | X |
| Example 5 | 34.56 | 144000 | ⊚ | ⊚ | ○ |
| Example 6 | 34.56 | 192000 | ⊚ | ⊚ | ⊚ |
| Example 7 | 103.68 | 288000 | ⊚ | ⊚ | ⊚ |
| Example 8 | 65.25 | 600000 | ⊚ | ⊚ | ⊚ |
| Example 9 | 29.92 | 440000 | ⊚ | ⊚ | ⊚ |
| Example 10 | 89.76 | 1320000 | ⊚ | ⊚ | ⊚ |
| Example 11 | 400 | 60000 | ○ | ⊚ | ⊚ |
| Comparative Example 1 | 0 | 0 | X | X | X |

TABLE 2-continued

| | Magnetic foil | | Evaluated results | | |
| --- | --- | --- | --- | --- | --- |
| | | | | Heat generation(Power transmission speed*) | |
| | Ms·t [T·μm] | ur'·t [μm] | Coupling | 0.4 W/h | 1.5 W/h |
| Comparative Example 2 | 9.9 | 90000 | ◉ | X | X |
| Comparative Example 3 | 9.9 | 108000 | ◉ | X | X |
| Comparative Example 4 | 9.9 | 342000 | ◉ | X | X |
| Comparative Example 5 | 5.225 | 171000 | ◉ | X | X |
| Comparative Example 6 | 2.75 | 85000 | ○ | X | X |
| Comparative Example 7 | 8.25 | 255000 | ◉ | X | X |
| Comparative Example 8 | 13.75 | 100000 | ○ | X | X |
| Comparative Example 9 | 13.75 | 137500 | ◉ | X | X |
| Comparative Example 10 | 13.75 | 175000 | ◉ | X | X |
| Comparative Example 11 | 12 | 19800 | X | X | X |

*Power receiving speed is 0.25 W/h when power transmission speed is 0.4 W/h and 0.9 W/h when it is 1.5 W/h.

It is apparent from Table 2 that the use of a magnetic foil having the Ms·t value of 15 or more enables to obtain good characteristics. The individual examples were substantially charged completely in two hours. In addition, a state of charging for two hours or more was maintained for five hours, but the temperature did not increase so much. It means that the temperature increase is saturated even when overcharging is performed. It is seen that charging (charging speed) to satisfy a battery capacity is important for the temperature increase (heat generation amount). Meanwhile, the heat generation amount was large in the comparative examples. In such cases, a problem is caused if charging is not performed for a long time with the power transmission amount decreased.

EXAMPLE 12

The magnetic foil (three amorphous alloy ribbons stacked) of Example 1 was formed to have a bent portion by bending the protruded portion (do=6 mm) on the outer peripheral side. A power receiving device was configured in the same manner as in Example 1, except that the obtained magnetic foil was used. Characteristics of the power receiving device were measured and evaluated in the same manner as in Example 1. The results are shown in Table 3.

EXAMPLE 13

Each slit was formed vertically and horizontally in the magnetic foil of Example 1 (see FIG. 10). The slit was determined to have a width of 100 μm. The power receiving device was configured in the same manner as in Example 1, except that the obtained magnetic foil was used. Characteristics of the power receiving device were measured and evaluated in the same manner as in Example 1. The results are shown in Table 3.

EXAMPLE 14

Plural slits were formed vertically and horizontally in the magnetic foil of Example 1 (see FIG. 11). The slits were determined to have a smaller cycle (forming pitch) toward the center of the magnetic foil. The slit width was determined to be in a range of 50 to 1000 μm. The power receiving device was configured in the same manner as in Example 1, except that the obtained magnetic foil was used. Characteristics of the power receiving device were measured and evaluated in the same manner as in Example 1. The results are shown in Table 3.

EXAMPLE 15

Plural slits were radially formed in the magnetic foil of Example 1 (see FIG. 12). The power receiving device was configured in the same manner as in Example 1, except that the obtained magnetic foil was used. Characteristics of the power receiving device were measured and evaluated in the same manner as Example 1. The results are shown in Table 3.

EXAMPLE 16

Plural slits were formed from ends to midpoints of the magnetic foil of Example 1 (see FIG. 13). The power receiving device was configured in the same manner as Example 1, except that the obtained magnetic foil was used. Characteristics of the power receiving device were measured and evaluated in the same manner as in Example 1. The results are shown in Table 3.

EXAMPLE 17

Both the slits running from the ends to midpoints and the independent slits were formed in plural in the magnetic foil of Example 1 (see FIG. 14). The power receiving device was configured in the same manner as in Example 1, except that the obtained magnetic foil was used. Characteristics of the power receiving device were measured and evaluated in the same manner as in Example 1. The results are shown in Table 3.

EXAMPLE 18

In the magnetic foil of Example 1, two of the three amorphous alloy ribbons were used as they were, and the remaining one was formed to have a bent portion by bending the outer peripheral portion (see FIG. 15). The power receiving device was configured in the same manner as in Example 1, except that the obtained magnetic foil was used. Characteristics of the power receiving device were measured and evaluated in the same manner as in Example 1. The results are shown in Table 3.

EXAMPLE 19

As shown in FIG. 3, the spiral coil was provided around the secondary battery. Besides, a magnetic foil having the same structure as in Example 1 was bent and disposed between the spiral coil and the circuit board and between the spiral coil and the secondary battery. The power receiving device was configured in the same manner as in Example 1, except that the obtained configuration was applied. Characteristics of the power receiving device were measured and evaluated in the same manner as in Example 1. The results are shown in Table 3.

TABLE 3

| | Magnetic foil | | | Heat generation (Power transmission speed*) | |
|---|---|---|---|---|---|
| | Composition | Shape | Coupling | 0.4 W/h | 1.5 W/h |
| Example 12 | Same to Exam. 1 | Bent portion | ◎ | ◎ | ◎ |
| Example 13 | Same to Exam. 1 | Slit | ○ | ◎ | ○ |
| Example 14 | Same to Exam. 1 | Slit | ○ | ◎ | ○ |
| Example 15 | Same to Exam. 1 | Slit | ○ | ◎ | ○ |
| Example 16 | Same to Exam. 1 | Slit | ○ | ◎ | ○ |
| Example 17 | Same to Exam. 1 | Slit | ◎ | ◎ | ◎ |
| Example 18 | Same to Exam. 1 | One ribbon bent | ◎ | ◎ | ◎ |
| Example 19 | Same to Exam. 1 | (Coil shape changed) | ◎ | ◎ | ◎ |

*Power receiving speed is 0.25 W/h when power transmission speed is 0.4 W/h and 0.9 W/h when it is 1.5 W/h.

It is apparent from Table 3 that various types of shapes can be applied to the magnetic foil. The magnetic foil having an appropriate shape can be used to provide additional effects.

EXAMPLE 20, COMPARATIVE EXAMPLE 12

As shown in Table 4, magnetic foil bodies (permalloys) having different $R \cdot \mu r'$ values were prepared. Power receiving devices were configured in the same manner as Example 1, except that the obtained magnetic foil bodies were used. Characteristics of the power receiving devices were measured and evaluated in the same manner as in Example 1. The results are also shown in Table 4. It is apparent from Table 4 that the $R \cdot \mu r'$ value is preferably $1.01 \times 10^{-3}$ or more.

TABLE 4

| | Magnetic foil | | | | Heat generation (Power transmission speed*) | |
|---|---|---|---|---|---|---|
| | Composition | R[Ω·m] | R · μr' | Coupling | 0.4 W/h | 1.5 W/h |
| Example 20 | Permalloy | $1.6 \times 10^{-7}$ | $1.3 \times 10^{-3}$ | ◎ | ◎ | ◎ |
| Comparative Example 12 | Permalloy | $1.6 \times 10^{-7}$ | $1.6 \times 10^{-4}$ | X | X | X |

*Power receiving speed is 0.25 W/h when power transmission speed is 0.4 W/h and 0.9 W/h when it is 1.5 W/h.

The present invention is not limited to the above-described embodiments but can be modified in various ways in practical stages without departing from the spirit and scope of the invention. The individual embodiments can be performed in appropriate combinations within a feasible range, and the effects based on the combination can be obtained accordingly. Besides, the above-described embodiments include the inventions in the various stages, and various inventions can be extracted by appropriately combining the disclosed plural composing requirements.

Industrial Applicability

The power receiving device and the electronic apparatus according to an embodiment of the present invention have a magnetic foil arranged in at least one position between a spiral coil and a secondary battery, a rectifier, an electronic device or a circuit board to suppress generation of eddy current due to electromagnetic induction. Thus, it becomes possible to suppress heat generation, noise generation, and a decrease in power reception efficiency due to the eddy current. The power receiving device and the electronic apparatus are effectively used for various types of electronic apparatuses applying non-contact charging.

What is claimed is:

1. A power receiving device, comprising:
   a power receiving coil having a spiral coil;
   a rectifier rectifying an alternating voltage generated in the power receiving coil;
   a secondary battery to which a direct-current voltage rectified in the rectifier is charged; and
   a magnetic foil arranged in at least one of a position between the spiral coil and the secondary battery, and a position between the spiral coil and the rectifier,
   wherein the magnetic foil comprises an amorphous alloy thin ribbon or an iron-based Microcrystalline alloy thin ribbon having an average thickness in a range of 5 to 50 μm,
   wherein the magnetic foil has a Ms·t value of 15 or more and 103.68 or less, where Ms [T] is a saturation flux density of the magnetic foil, t [μm] is a plate thickness of the the magnetic foil, and the Ms·t value [T·μm] is a product of the saturation flux density Ms and the plate thickness t,
   wherein the power receiving coil has a power receiving rate of 0.25 W/h or more.

2. The power receiving device according to claim 1, wherein the magnetic foil has a μr'·t value of 40000 or more, where μr' is a real component of relative permeability of the magnetic foil and the μr'·t value [μm] is a product of the real component μr' of the relative permeability and the plate thickness t.

3. The power receiving device according to claim 1, wherein the magnetic foil has a R·μr' value of $1.01 \times 10^{-3}$ or more, where R [Ω·m] is an electric resistivity of the magnetic foil, μr' is a real component of relative permeability of the magnetic foil, and the R·μr' value [Ω·m] is a product of the electric resistivity R and the real component μr' of the relative permeability.

4. The power receiving device according to claim 1, wherein an outer peripheral edge of the magnetic foil extends outward farther than an outer peripheral portion of the spiral coil.

5. The power receiving device according to claim 1, wherein the magnetic foil has a slit.

6. The power receiving device according to claim 1, wherein the secondary battery is an lithium ion secondary battery.

7. An electronic apparatus, comprising:
a power receiving device which is provided with a power receiving coil having a spiral coil, a rectifier rectifying an alternating voltage generated in the power receiving coil, and a secondary battery to which a direct-current voltage rectified in the rectifier is charged;
an electronic apparatus body which is provided with an electronic device which is operated by the direct-current voltage supplied from the secondary battery, and a circuit board on which the electronic device is mounted; and
a magnetic foil arranged in at least one of a position between the spiral coil and the secondary battery, a position between the spiral coil and the rectifier, a position between the spiral coil and the electronic device, and a position between the spiral coil and the circuit board,
wherein the magnetic foil comprises an amorphous alloy thin ribbon or an iron-based Microcrystalline alloy thin ribbon having an average thickness in a range of 5 to 50 µm,
wherein the magnetic foil has a Ms·t value of 15 or more and 103.68 or less, where Ms [T] is a saturation flux density of the magnetic foil, t [µm] is a plate thickness of the the magnetic foil, and the Ms·t value [T·µm] is a product of the saturation flux density Ms and the plate thickness t,
wherein the power receiving coil has a power receiving rate of 0.25 W/h or more.

8. The electronic apparatus according to claim 7, wherein the magnetic foil has a µr'·t value of 40000 or more, where µr' is a real component of relative permeability of the magnetic foil and the µr'·t value is a product of the real component µr' of the relative permeability and the plate thickness t.

9. The electronic apparatus according to claim 7, wherein the magnetic foil has a R·µr' value of $1.01 \times 10^{-3}$ or more, where R [Ω·m] is an electric resistivity of the magnetic foil, µr' is a real component of relative permeability of the magnetic foil, and the R·µr' value [Ω·m] is a product of the electric resistivity R and the real component µr' of the relative permeability.

10. The electronic apparatus according to claim 7, wherein the spiral coil is arranged around the secondary battery, and the magnetic foil is arranged between the spiral coil and the circuit board.

11. The electronic apparatus according to claim 7, wherein the magnetic foil has a bent portion which is formed by bending an outer peripheral edge of the magnetic foil in a direction opposite to the circuit board.

12. The electronic apparatus according to claim 7, wherein an outer peripheral edge of the magnetic foil extends outward farther than an outer peripheral portion of the spiral coil.

13. The electronic apparatus according to claim 7, wherein the magnetic foil has a slit.

14. The electronic apparatus according to claim 7, wherein the secondary battery is an lithium ion secondary battery.

15. A non-contact charger, comprising:
the electronic apparatus according to claim 7; and
a power feeding device which is provided with a power feeding coil arranged in a non-contact manner with the power receiving coil of the electronic apparatus and a power supply supplying an alternating voltage to the power feeding coil,
wherein magnetic flux generated in the power feeding coil is transmitted to the power receiving coil to transmit electric power in a non-contact manner.

16. The power receiving device according to claim 1, wherein the magnetic foil comprises a plurality of the amorphous alloy thin ribbons or a plurality of the iron-based microcrystalline alloy thin ribbons, and the plate thickness t of the magnetic foil is a total thickness of the plurality of amorphous alloy thin ribbons or of the plurality of iron-based microcrystalline alloy thin ribbons.

17. The power receiving device according to claim 7, wherein the magnetic foil comprises a plurality of the amorphous alloy thin ribbons or a plurality of the iron-based microcrystalline alloy thin ribbons, and the plate thickness t of the magnetic foil is a total thickness of the plurality of amorphous alloy thin ribbons or of the plurality of the iron-based microcrystalline alloy thin ribbons.

* * * * *